US009429262B2

(12) United States Patent
Ericksen et al.

(10) Patent No.: US 9,429,262 B2
(45) Date of Patent: Aug. 30, 2016

(54) CONDUIT COUPLING APPARATUS AND METHOD

(75) Inventors: Kent C. Ericksen, Centerville, UT (US); Scot W. Hoskisson, Chesterfield, MI (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 866 days.

(21) Appl. No.: 13/216,101

(22) Filed: Aug. 23, 2011

(65) Prior Publication Data

US 2011/0304137 A1      Dec. 15, 2011

Related U.S. Application Data

(60) Provisional application No. 61/489,624, filed on May 24, 2011.

(51) Int. Cl.
*F16L 37/091* (2006.01)
*F16L 43/00* (2006.01)

(52) U.S. Cl.
CPC ............ *F16L 43/008* (2013.01); *F16L 37/091* (2013.01); *Y10T 29/49876* (2015.01)

(58) Field of Classification Search
CPC ............................. F16L 37/091; F16L 43/008
USPC ................................................ 285/340, 921
See application file for complete search history.

(56) References Cited

U.S. PATENT DOCUMENTS

| | | | |
|---|---|---|---|
| 487,829 A * | 12/1892 | England | 285/39 |
| 991,501 A | 5/1911 | Graves | |
| 2,514,717 A | 7/1950 | Power | |
| 3,051,514 A | 8/1962 | Consolloy | |
| 3,155,402 A | 11/1964 | Cornelius | |
| 3,312,483 A * | 4/1967 | Leadbetter et al. | 285/340 |
| 3,633,944 A * | 1/1972 | Hamburg | 285/81 |
| 3,837,687 A | 9/1974 | Leonard | |
| 3,976,314 A | 8/1976 | Graham | |
| 4,005,883 A | 2/1977 | Guest | |
| 4,047,739 A | 9/1977 | Aitken | |
| 4,123,090 A | 10/1978 | Katsakis et al. | |
| 4,266,814 A | 5/1981 | Gallagher | |
| 4,288,113 A | 9/1981 | Saulnier | |
| 4,440,424 A | 4/1984 | Mode | |

(Continued)

FOREIGN PATENT DOCUMENTS

| | | |
|---|---|---|
| EP | 0226553 A1 | 6/1987 |
| EP | 0 240 452 A1 | 7/1987 |

(Continued)

OTHER PUBLICATIONS

The document attached hereto as Attachment A comprises an International Search Report for PCT/US2012/039457 issued on Aug. 31, 2012.

(Continued)

*Primary Examiner* — David E Bochna
*Assistant Examiner* — James Linford
(74) *Attorney, Agent, or Firm* — Austin Rapp & Hardman

(57) ABSTRACT

A coupling for conveying fluid between a component of a fluid system and an insertion end of a conduit may include tapered inward protrusions. The coupling may also include a stop surface disposed at a generally perpendicular angle with respect to one or more planar surfaces of the tapered inward protrusions.

19 Claims, 10 Drawing Sheets

(56) References Cited

U.S. PATENT DOCUMENTS

| | | |
|---|---|---|
| 4,573,716 A | 3/1986 | Guest |
| 4,593,943 A | 6/1986 | Hama et al. |
| 4,606,783 A | 8/1986 | Guest |
| 4,630,848 A | 12/1986 | Twist et al. |
| 4,657,286 A | 4/1987 | Guest |
| 4,712,810 A | 12/1987 | Pozzi |
| 4,722,558 A | 2/1988 | Badoureaux |
| 4,747,626 A | 5/1988 | Hama et al. |
| 4,777,669 A | 10/1988 | Rogus |
| 4,804,213 A | 2/1989 | Guest |
| 4,834,423 A | 5/1989 | DeLand |
| 4,895,395 A | 1/1990 | Ceriani |
| 4,919,457 A | 4/1990 | Moretti |
| 4,925,217 A | 5/1990 | Ketcham |
| 4,946,213 A | 8/1990 | Guest |
| 4,951,975 A | 8/1990 | Bartholomew |
| 5,005,877 A | 4/1991 | Hayman |
| 5,069,424 A | 12/1991 | Dennany, Jr. et al. |
| 5,105,854 A | 4/1992 | Cole et al. |
| 5,135,268 A | 8/1992 | McNaughton et al. |
| 5,152,555 A | 10/1992 | Szabo |
| 5,160,179 A | 11/1992 | Takagi |
| 5,171,045 A | 12/1992 | Pasbrig |
| 5,178,424 A | 1/1993 | Klinger |
| 5,219,188 A | 6/1993 | Abe et al. |
| 5,230,539 A | 7/1993 | Olson |
| 5,292,157 A | 3/1994 | Rubichon |
| 5,328,215 A | 7/1994 | Grenier |
| 5,366,262 A | 11/1994 | Couvreur |
| 5,378,025 A | 1/1995 | Szabo |
| 5,401,064 A | 3/1995 | Guest |
| 5,415,825 A | 5/1995 | Sellers |
| 5,437,483 A | 8/1995 | Umezawa |
| 5,464,228 A | 11/1995 | Weber et al. |
| 5,487,572 A | 1/1996 | Combot-Courrau et al. |
| 5,496,073 A | 3/1996 | Grenier |
| 5,518,276 A | 5/1996 | Gunderson |
| 5,551,732 A | 9/1996 | Bartholomew |
| 5,551,735 A | 9/1996 | Takayanagi et al. |
| 5,655,796 A | 8/1997 | Bartholomew |
| 5,692,784 A | 12/1997 | Hama et al. |
| 5,695,224 A | 12/1997 | Grenier |
| 5,722,696 A | 3/1998 | Taneya |
| 5,727,821 A | 3/1998 | Miller |
| 5,775,738 A | 7/1998 | Bartholomew |
| 5,794,984 A | 8/1998 | Bartholomew |
| 5,911,443 A | 6/1999 | Le Quere |
| 5,934,709 A | 8/1999 | Morrison |
| 5,943,709 A | 8/1999 | Chiu |
| 5,989,240 A | 11/1999 | Strowe |
| 6,010,160 A | 1/2000 | Bartholomew |
| 6,062,607 A | 5/2000 | Bartholomew |
| 6,142,538 A | 11/2000 | Volgstadt et al. |
| 6,145,887 A | 11/2000 | Cambot-Courrau |
| 6,170,886 B1 | 1/2001 | Bartholemew |
| 6,174,002 B1 | 1/2001 | Rho |
| 6,183,020 B1 | 2/2001 | Luft |
| 6,183,022 B1 | 2/2001 | Guest |
| 6,312,020 B1 | 11/2001 | Ketcham et al. |
| 6,464,266 B1 | 10/2002 | O'Neill et al. |
| 6,550,815 B2 | 4/2003 | Zitkowic, Jr. et al. |
| 6,557,899 B2 | 5/2003 | Martin-Cocher et al. |
| 6,749,231 B2 | 6/2004 | LeMay et al. |
| 7,021,672 B2 | 4/2006 | Ericksen et al. |
| 7,195,287 B2 | 3/2007 | Wai |
| 7,445,247 B2 | 11/2008 | Ericksen et al. |
| 7,810,850 B2 | 10/2010 | O'Neill et al. |
| 7,942,161 B2 | 5/2011 | Crompton |
| D732,359 S | 6/2015 | Ericksen et al. |
| 2004/0240940 A1 | 12/2004 | Ericksen et al. |
| 2005/0206160 A1 | 9/2005 | Ericksen et al. |
| 2006/0108802 A1 | 5/2006 | Baumgartner |
| 2007/0138791 A1 | 6/2007 | Greenberger |
| 2007/0241562 A1* | 10/2007 | O'Neill et al. ............... 285/340 |
| 2009/0160178 A1 | 6/2009 | Ericksen |
| 2009/0160179 A1 | 6/2009 | Ericksen |
| 2010/0314863 A1* | 12/2010 | Ohara et al. ............... 285/31 |
| 2012/0248764 A1 | 10/2012 | Ericksen |

FOREIGN PATENT DOCUMENTS

| | | | |
|---|---|---|---|
| EP | 0255368 A1 | 2/1988 | |
| EP | 0738851 A1 | 10/1996 | |
| EP | 0745801 A1 | 12/1996 | |
| EP | 1521027 | 4/2005 | |
| EP | 1521027 A1 * | 4/2005 | ............ F16L 37/091 |
| FR | 1382077 A | 12/1964 | |
| FR | 2871216 | 12/2005 | |
| GB | 916070 * | 9/1961 | |
| GB | 2109885 | 6/1983 | |
| GB | 2155576 | 9/1985 | |
| GB | 2155576 A * | 9/1985 | ............ F16L 21/08 |
| WO | 2012162554 A1 | 11/2012 | |

OTHER PUBLICATIONS

The document attached hereto as Attachment B is a publication by Cash Acme with an apparent publication date at least by Sep. 3, 2004.

The document attached hereto as Attachment C is a publication by Cash Acme with a stated issue date of Aug. 2004.

The document attached hereto as Attachment D is a publication by Cash Acme with a stated publication date of Aug. 12, 2004.

The document attached hereto as Attachment E is a publication by Cash Acme with a stated issue date of May 2009.

Office Action for European Patent Application No. EP 03 781 541.2 dated Apr. 26, 2011.

European Search Report for European App. No. EP 87 63 0045, Search Completed on Jul. 8, 1987.

PCT International Patent Publication No. WO2004106794, Published on Dec. 9, 2004.

Search Report for PCT International Patent Publication No. WO2004106794, Mailed on Sep. 21, 2006.

Chinese Patent Application No. CN1942698 A, Published on Apr. 4, 2007.

Product sheet distributed at a trade show on or before Nov. 19, 2003.

Office Action Issued for U.S. Appl. No. 10/678,013 on Sep. 17, 2004.

Office Action Issued for U.S. Appl. No. 10/678,013 on Feb. 9, 2005.

Office Action Issued for U.S. Appl. No. 10/678,013 on May 26, 2005.

Office Action Issued for U.S. Appl. No. 11/124,217 on Jul. 10, 2007.

Office Action Issued for U.S. Appl. No. 11/124,217 on Feb. 11, 2008.

Office Action Issued for U.S. Appl. No. 12/263,602 on Jul. 19, 2010.

Office Action Issued for U.S. Appl. No. 12/263,567 on Aug. 3, 2011.

International Search Report for PCT Application No. PCT/US2003/034542 dated Sep. 21, 2006.

Supplemental European Search Report for European Patent Application No. EP 03 78 1541 dated Feb. 15, 2010.

Office Action for European Patent Application No. EP 03 78 154 dated Apr. 26, 2011.

U.S. Appl. No. 29/430,121, filed Aug. 21, 2012, Kent C. Ericksen et al.

U.S. Appl. No. 13/911,068, filed Jun. 5, 2013, Kent C. Ericksen et al.

English Translation of Chinese Patent Publication No. CN19426898, entitled Irrigation Coupling Apparatus and Method, Corresponding Chinese Application Published on Apr. 4, 2007.

Nibco Inc., Truconnect, A web page retrieved on Nov. 21, 2011, published on or before Nov. 21, 2003, URL: http://www.nibco.com/newproducts/TruConnect.shtml.

Interview Summary, U.S. Appl. No. 11/124,217, Mailed on Oct. 23, 2007.

Notice of Allowance and Fee(s) Due, U.S. Appl. No. 11/124,217, Mailed on Sep. 5, 2008.

Examiner-Initiated Interview Summary, U.S. Appl. No. 11/124,217, Mailed on Sep. 5, 2008.

(56) References Cited

OTHER PUBLICATIONS

Detailed Action of Notice of Allowance and Fee(s) Due, U.S. Appl. No. 11/124,217, Mailed on Sep. 5, 2008.
Notification of Transmittal of the International Search Report and the Written Opinion of the International Searching Authority, or the Declaration, International Patent PCT App. No. PCT/US2012/039457, Mailed on Aug. 31, 2012.
International Search Report, International Patent PCT App. No. PCT/US2012/039457, Mailed on Aug. 31, 2012.
Written Opinion of the International Searching Authority, International Patent PCT App. No. PCT/US2012/039457, Mailed on Aug. 31, 2012.
Cash Acme, SharkBite Water Heater Installation Kit, Installation Guide, Published at least by Sep. 3, 2004.
Cash Acme, SharkBite Water Heater Installation Kit, Installation Guide, Issue Date of Aug. 2004.
Cash Acme, SharkBite Push-Fit Fittings, Web page retrieved on Aug. 12, 2004, Published at least by Aug. 12, 2004, URL: http://www.cashacme.com/sharkbite.html.
Cash Acme, SharkBite Push-Fit Fittings, Installation Guide, Issue Date of May 2009.
U.S. Appl. No. 13/479,515, filed May 24, 2012, Kent C. Ericksen et al.
Non-Final Rejection, U.S. Appl. No. 13/479,515, Mailed on Aug. 20, 2015.
U.S. Appl. No. 29/530,873, filed May 19, 2015, Orbit Irrigation Products, Inc.
U.S. Appl. No. 13/479,515, Restriction Requirement, mailed on Mar. 19, 2015.
U.S. Appl. No. 13/479,515, Restriction Requirement Response, dated Jun. 18, 2015.
U.S. Appl. No. 13/479,515, Office Action, mailed on Aug. 20, 2015.
U.S. Appl. No. 13/479,515, Office Action Response, dated Jan. 20, 2016.
U.S. Appl. No. 13/911,068, Restriction Requirement, mailed on May 21, 2015.
U.S. Appl. No. 13/911,068, Restriction Requirement Response, dated Jul. 15, 2015.
U.S. Appl. No. 13/911,068, Office Action, mailed on Oct. 26, 2015.
U.S. Appl. No. 13/911,068, Office Action Response, dated Mar. 28, 2016.
U.S. Appl. No. 29/430,121, Preliminary Amendment, dated Sep. 7, 2013.
U.S. Appl. No. 29/430,121, Notice of Allowance and Fee(s) Due (including a Notice of Allowability For A Design Application section, an Election of Group section, and information Disclosure Statement section, an Examiner's Amendment section, a Drawings section, a Corrected the Drawings Required section, and a Specification section), mailed on Jul. 29, 2014.
U.S. Appl. No. 29/430,121, Continued Prosecution Application (including a Preliminary Amendment), dated Oct. 29, 2014.
U.S. Appl. No. 29/430,121, Notice of Allowance and Fee(s) Due (including a Notice of Allowability for A Design Application section, and an Examiner's Comment section), mailed on Feb. 17, 2015.
U.S. Appl. No. 13/479,515, Supplemental Amendment, dated on Jun. 10, 2016.
U.S. Appl. No. 13/479,515, Notice of Allowance and Fee(s) Due (including a Notice of Allowability section, and a Reasons for Allowance section), mailed on Jun. 30, 2016.
U.S. Appl. No. 13/479,515, Examiner Interview Summary, dated on Jun. 10, 2016.

* cited by examiner

CONDUIT COUPLING APPARATUS AND METHOD

RELATED APPLICATIONS

This application claims priority to U.S. Provisional Patent App. Ser. No. 61/489,624 that was filed on May 24, 2011, and titled CONDUIT COUPLING APPARATUS AND METHOD. The foregoing application is incorporated herein by this reference.

TECHNICAL FIELD

The present invention relates to couplings for fluid systems. More specifically, the present invention relates to couplings that may be used to easily retain or release flexible plastic tubing such as are typically used in irrigation systems.

BACKGROUND

Many types of systems have components between which fluid is conveyed through conduits. Such fluid systems include irrigation systems, household plumbing, air conditioning systems, heater humidifiers, misting systems, and garden hoses. Typically, the conduits of the fluid system must be coupled to components in such a manner that a fluid-tight seal is maintained. Thus, the process of connecting the conduits to their respective components can be somewhat time-consuming.

For example, in a standard residential irrigation system, lengths of polyvinylchloride (PVC) pipe are typically buried to act as conduits. The lengths of pipe must be attached to components of the system such as manifolds, electric valves, stop and waste valves, backflow prevention devices, sprinkler heads, and drip irrigation tubes. In some cases, other conduits such as "flexi-pipe" may be used to couple a PVC pipe to an irrigation component.

More precisely, the lengths of PVC pipe or conduit must often be attached to each other or to irrigation components via application of primer and plastic cement. Such a process is somewhat time consuming and messy, and provides a relatively unreliable connection. To the extent that threaded or barbed fittings can be used, connection may be performed more rapidly than with primer and glue, but the integrity of the connection is still uncertain.

Furthermore, a glued connection cannot be released. Hence, if such a junction is faulty, the PVC pipe or flexi-pipe on either side of the junction must be severed, and one or more new junctions must be glued in place. Threaded fittings require that one of the parts be rotatable during attachment. Barbed fittings may be difficult for some people to install due to the force required to insert the barbs far enough to provide retention. Thus, connecting the components and lengths of PVC pipe and/or flexi-pipe together may be somewhat cumbersome and time-consuming.

Various types of couplings are available to attach irrigation components, PVC pipe, and/or flexible tubing together. However, known couplings have a number of inherent disadvantages. Often, such couplings require primer and glue, threaded attachment, or barbed attachment, and therefore add significantly to the required installation time. Some such couplings require tooling for attachment or detachment. Some couplings are not readily detachable, while others may not function properly under certain conditions, such as when buried underground.

Yet further, many known couplings do not indicate the proper size of conduit to make a fluid-tight connection with the coupling. Different manufacturers make irrigation flexi-pipe in sizes that are different enough to be incompatible, and yet similar enough to appear the same. Hence, many consumers may accidentally purchase or attempt to connect couplings and flexi-pipe that are incompatible with each other.

Still further, many known couplings designed to connect to flexi-pipe are rigid, and therefore require the flexi-pipe to be connected to the coupling at only one angle. Such an arrangement may tend to place undue stress on the flexi-pipe. The flexi-pipe may thus become weakened, disconnected, or pinched as a result.

SUMMARY OF THE INVENTION

The following summary includes only illustrative embodiments of the disclosed subject matter and it is not to be construed as limiting the claimed subject matter.

In one embodiment, a coupling for conveying fluid between a component of a fluid system and an insertion end of a conduit is disclosed. The outer surface of the insertion end of the conduit may be smooth and free of grooves, flanges and beads. A first member may have an exterior surface and an interior surface. The interior surface of the first member may define a first passageway through the first member. The first passageway may extend from an entry end to a securing end of the first member. The interior surface may further comprise a recess defining portion. The recess defining portion may define a circular recess that has a generally J-shaped cross-sectional perimeter. The generally J-shaped cross-sectional perimeter may include a first angled face.

A second member may be in snap fit engagement with the first member. The second member may have an exterior surface and an interior surface. The interior surface of the second member may define a second passageway through the second member. The second passageway may extend from an attachment end to an opposite end of the second member. The interior surface may further define an annular recess at the attachment end of the second member. The second member may enclose only two of four quadrants of the annular recess.

A gripping ring may have an inner edge defining a series of teeth. The gripping ring may be disposed within the circular recess of the first member.

A support ring may be rotatably disposed within the circular recess of the first member. The support ring may have a proximal face that abuts the gripping ring, a distal face that encloses a third of the four quadrants of the annular recess, and a second angled face situated at an acute angle relative to the first angled face when the coupling is in an unengaged position. An O-ring may be disposed within the annular recess.

In one embodiment, the J-shaped cross-sectional perimeter may further comprise a long face and a short face. Also, the gripping ring may include an outer body. In such an embodiment, the outer body of the gripping ring may abut the short face and the series of teeth of the gripping ring may abut the first angled face when the coupling is in an unengaged position. Also, an exterior surface of the gripping ring may abut the long face of the J-shaped cross-sectional perimeter.

The first passageway may be in fluid communication with the second passageway to form a coupling passageway. The coupling passageway may extend along a longitudinal axis of the coupling.

In addition, the entry end of the first member may include an entry face defining an entry opening. The entry face may comprise a raised portion surrounding the entry opening.

The interior surface of the first member may further define a mouth region. The first angled face may be disposed at an acute angle relative to the mouth region. The first angled face and the mouth region may define an acute extension of the first member.

In one embodiment, the interior surface of the second member further may define a plurality of tapered inward protrusions.

The method of manufacturing a coupling is also disclosed. One such method may comprise positioning the O-ring within the annular recess of the second member such that the second member encloses only two of four quadrants of the annular recess. The gripping ring may be positioned within the circular recess of the first member.

The support ring may be positioned within the circular recess of the first member such that the proximal face of the support ring abuts the gripping ring. The first member may be placed in snap fit engagement with the second member such that the distal face of the support ring encloses the third of the four quadrants of the annular recess.

Positioning the gripping ring within the circular recess of the first member may comprise positioning an outer body of the gripping ring such that the outer body of the gripping ring abuts the short face and the series of teeth of the gripping ring abut the first angled face of the generally J-shaped cross-sectional perimeter.

Positioning the support ring within the circular recess of the first member may comprise positioning the support ring within the circular recess such that the proximal face of the support ring abuts the outer body of the gripping ring and the exterior surface of the support ring abuts the long face of the J-shaped cross-sectional perimeter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

Figure 1:
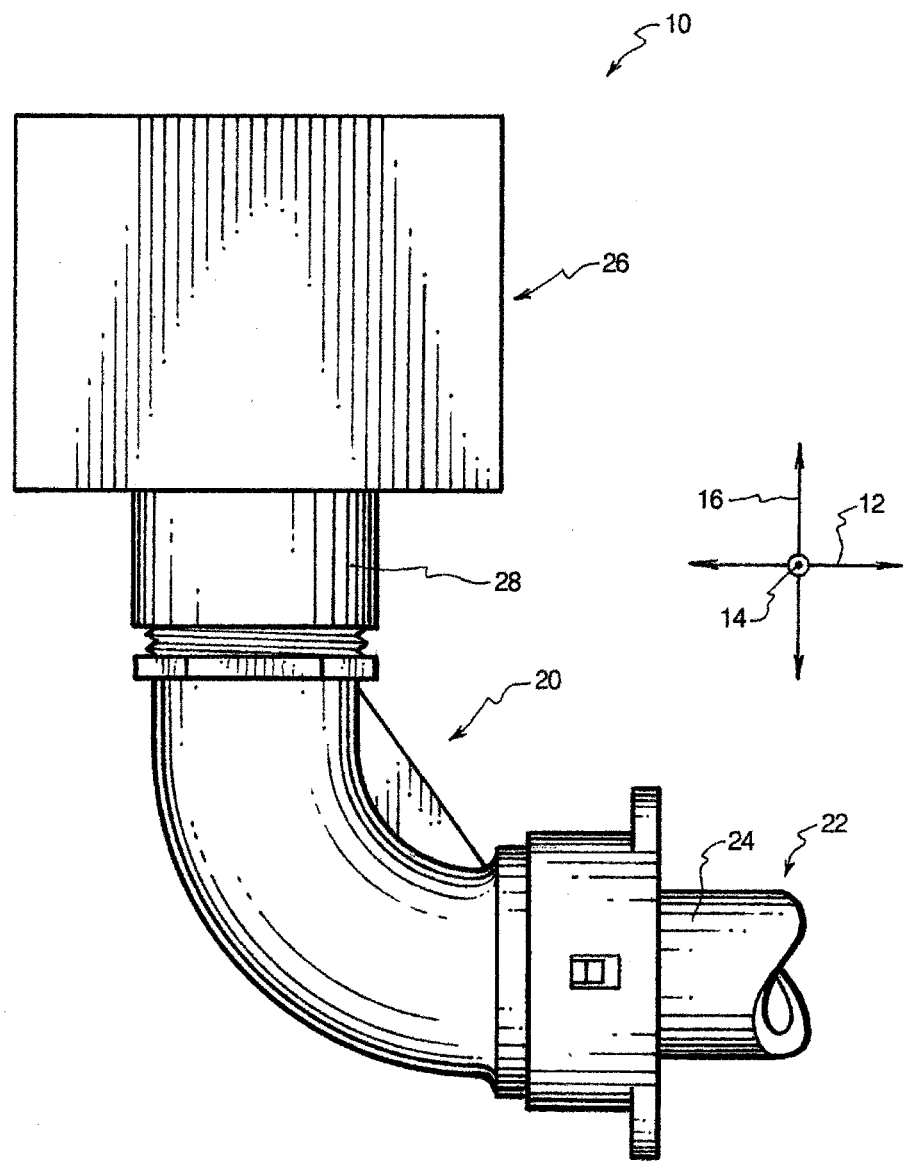
FIG. 1 is a side elevation view of a portion of a generalized fluid system having a component and a conduit interconnected by a first embodiment of a coupling incorporating teachings of the present invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 9, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Referring to FIG. 1, a side elevation view illustrates a portion of a generalized fluid system 10 according to one embodiment of the invention. A "fluid system" refers to any type of system that contains and/or moves fluid (including liquids, gases, and liquid/gas mixtures) through any type of conduit. The fluid system 10 may be of a wide variety of types, including but not limited to irrigation systems, heater humidification systems, air conditioning systems, evaporative cooling systems, misting systems for outdoor comfort, and the like. For convenience in this discussion, the fluid system 10 is assumed to be an irrigation system for distributing water onto soil.

Figure 2:
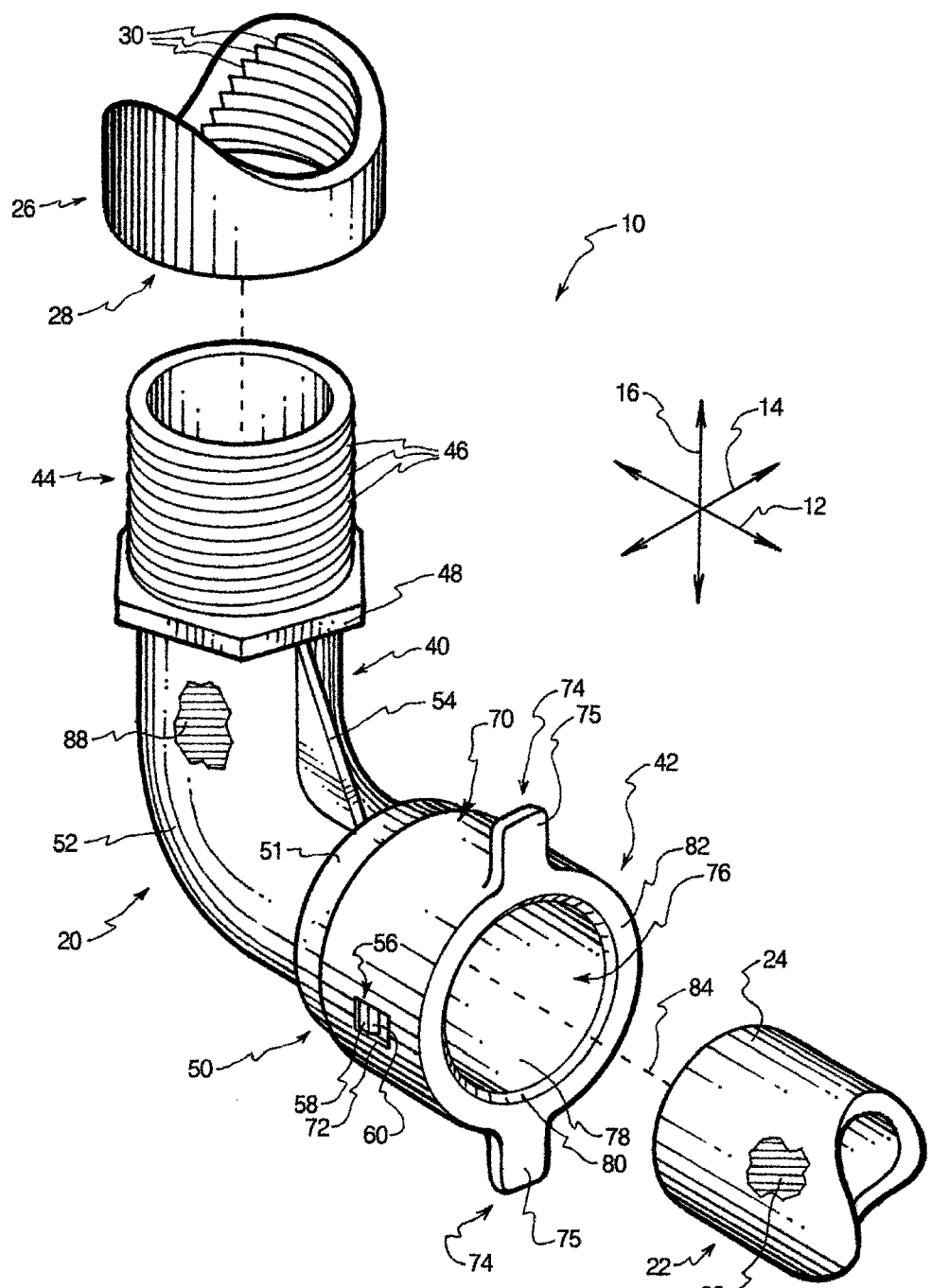
FIG. 2 is an exploded perspective view of the fluid system of FIG. 1.

The fluid system 10 has a longitudinal direction 12, a lateral direction 14, and a transverse direction 16. As shown, the fluid system 10 includes a coupling 20, which is designed to be attached to a length of conduit 22. The conduit 22 may include any of a variety of conduit types, including metal tubing, PVC pipe, or plastic "flexi-pipe" of a type commonly used in residential sprinkler systems. The conduit 22 has an end 24, an insertion end 24, designed to be captured by the coupling 20. As illustrated in FIG. 2, the outer surface 23 of the insertion end 24 of the conduit 22 is smooth and is free of grooves, flanges, and beads.

The coupling 20 provides fluid communication between the conduit 22 and a component 26, which may be any of a variety of fluid implements. "Fluid communication" refers to the existence of a generally enclosed fluid flow pathway between two articles. In the fluid system 10 of FIG. 1, the component 26 is designed for irrigation, and may thus include implements such as sprinkler heads, perforated water distribution tubes, electrically operated valves, stop and waste valves, backflow preventers, sprinkler risers, spray nozzles, garden hoses, and conduits. Since the invention includes a wide variety of fluid systems aside from irrigation systems, the term "component" contemplates the use of a wide variety of other types of fluid implements.

A "spray nozzle" may be any of a variety of nozzles such as hand sprayers for irrigation or household cleaning, misting nozzles designed to provide a comfortable mist in warm weather, internal furnace humidifier nozzles, and the like. A "perforated water distribution tube" may include drip irrigation lines, water distribution lines for evaporative coolers, and the like. A "valve" includes many different types of valves, including check valves, electrically operated valves, manually operated valves, and the like. A stop and waste valve for irrigation systems is included within the term "valve."

In one embodiment, the component 26 is a sprinkler designed to be seated in the ground in a vertical orientation and fed by fluid flowing generally horizontally through the conduit 22. Thus, the coupling 20 is shaped to form a ninety-degree angle. The coupling 20 may thus be termed an "elbow fitting." In other embodiments, similar couplings could be made straight, U-shaped, or with any other desirable angle. The component 26 has a fitting such as a threaded end 28 designed to engage the coupling 20. A "fitting" need not be a separate fastening device, but may simply be an attachment interface integrally formed with a component.

Referring to FIG. 2, an exploded, perspective view illustrates a portion of the fluid system 10 of FIG. 1 in greater detail. As shown, the threaded end 28 of the component 26 has been cut away to reveal that the threaded end 28 has threads disposed on an inside diameter thereof. The threads 30 thus act as female threads to attach the coupling 20 to the component 26. Of course, in an alternative embodiment, the component 26 could have male threads and the coupling 20 could have female threads.

In the embodiment shown, the coupling 20 has a body 40 and a release mechanism 42 that is slidable with respect to the body 40 along the longitudinal direction 12. "Slidable" refers to the ability for two objects to move relative to and in contact with each other. "Sliding" encompasses linear motion, rotary motion, and combinations thereof. In the embodiment shown, the release mechanism 42 is generally ring-shaped, and may thus be termed a release ring 42. The body 40 has a first end 44 designed to be connected to the threaded end 28 of the component 26. The first end 44 thus has threads 46 sized to mate with the threads 30 of the threaded end 28. Additionally, the first end 44 may have a hexagonal lip 48 that facilitates rotational coupling and tightening of the first end 44 with the threaded end 28 of the component 26.

In alternative embodiments, a wide variety of fitting types may be used in place of the threads 30 of the first end 44. For example, a female threaded fitting, quick-connect coupling, swage lock, snap-in fitting, or the like may be used to connect to a wide variety of corresponding fittings.

The body 40 also has a second end 50 in which a shoulder 51 is formed. The shoulder 51 is generally tubular in shape. The second end 50 and the first end 44 are separated by a bend 52 that provides the ninety-degree angle. The bend 52 is structurally supported by a gusset 54 that extends generally from the first end 44 to the second end 50.

The second end 50 has a pair of retention features 56 displaced from each other in the lateral direction 14, and thus positioned on opposite sides of the shoulder 51. The retention features 56 are designed to slidably retain the release ring 42. Each retention feature 56 has a plateau 58 that limits relative motion between the release ring 42 and the body 40, and a ramp 60 adjoining the plateau 58 to facilitate assembly of the release ring 42 and the body 40.

The release ring 42 has an exterior sleeve 70. The exterior sleeve 70 is sized just larger than the shoulder 51 so that the exterior sleeve 70 is able to act as a dirt shield, thereby preventing entry of dirt or other particles into the space between the release ring 42 and the second end 50. The exterior sleeve 70 extends a sufficient distance in the longitudinal direction 12 to provide a relatively snug fit between the release ring 42 and the second end 50 and enhance protection from contamination. The operation of the exterior sleeve 70 as a dirt shield will be discussed in greater detail subsequently. The dimensions of the exterior sleeve 70 also facilitate longitudinal motion of the release ring 42 with respect to the body 40 by maintaining the concentricity of the release ring 42 with the second end 50.

A pair of retention slots 72 is formed in the exterior sleeve 70 and positioned such that the retention features 56 extend into the retention slots 72. Each of the retention slots 72 is generally rectangular in shape, and is slightly longer in the longitudinal direction 12 than the combined longitudinal dimensions of the plateau 58 and the ramp 60 of the corresponding retention feature 56. Thus, the exterior sleeve 70 is able to move a limited distance in the longitudinal direction 12 with respect to the second end 50 of the body 40.

Disposition of the retention slots 72 and the retention features 56 on the outside of the coupling 20 is advantageous because they are relatively easy to manufacture and manipulate, and they do not interfere with insertion of the conduit 22 into the coupling 20. The retention slots 72 and the retention features 56 also operate in such a manner that no rotation of the release ring 42 is required to move between engaged and disengaged configurations. In alternative embodiments, a release mechanism may be rotatable or translatable and rotatable.

When the release ring 42 is extended from the second end 50, to the furthest extent permitted by the interlocking of the retention features 56 with the retention slots 72, the coupling 20 is in the engaged configuration, in which the end 24 of the conduit 22 may be retained within the coupling 20. When the release ring 42 is pressed toward the second end 50, the coupling 20 is in the disengaged configuration to permit removal of the end 24 from the coupling 20.

As shown, the release ring 42 also has a pair of release grips 74 extending in the transverse direction 16. The release grips 74 may be easily gripped and/or pressed in the longitudinal direction 12 to press the release ring 42 toward the second end 50 of the body 40. The release grips 74 facilitate movement of the release ring 42 in the longitudinal direction 12 by providing contact surfaces 75 that are generally perpendicular to the longitudinal direction 12. The contact surfaces 75 are easily and comfortably pressed by a user's fingers and/or thumb to exert the necessary pressure on the release ring 42. The release grips 74 may also facilitate one-handed actuation of the coupling 20 between the engaged and disengaged configurations.

The release ring 42 also has an interior sleeve 76 that defines a bore 78 into which the end 24 of the conduit 22 is inserted. A countersink 80 of the release ring 42 is disposed outside of and adjacent to the bore 78 to facilitate insertion of the end 24 into the bore 78. The release ring 42 has an annular wall 82 that extends from the interior sleeve 76 to the exterior sleeve 70. The shoulder 51 has an axis 84 extending along the longitudinal direction 12. The axis 84 is shared by the exterior sleeve 70, the interior sleeve 76, the annular wall 82, and a bore (not shown) of the body within the shoulder 51.

In alternative embodiments, the release ring 42 may simply be omitted. The corresponding coupling (not shown) may then be designed to permanently (i.e., non-releasably) retain the end of a conduit. Alternatively, such a coupling may release the end of the conduit in response to pressure from an external implement, such as a collar (not shown) slidable around the conduit. Such a collar may have two halves that are hinged or otherwise separable to permit removal of the collar from the conduit so that a single collar can be used to trigger release of a plurality of couplings.

Returning to the embodiment of FIG. 2, the conduit 22 has an indicator 86 disposed on its outside diameter. The indicator 86 indicates the size of the conduit 22, and may more particularly relate to the magnitude of the outside diameter of the conduit 22. Different manufacturers make flexible irrigation tubing in similar, and yet significantly different sizes. Consequently, a user may find it difficult to determine which irrigation implements are attachable to a given length of flexi-pipe. The indicator 86 is easily visible to the user to indicate the size of the conduit 22.

In this application, "indicating the size" does not necessarily require conveying the numerical size to a user; rather, only the category within which the size falls need be conveyed. Thus, the indicator 86 need not include letters or numbers, but may simply be a color. In the embodiment of FIG. 2, the indicator 86 is the color blue. The color blue may be useful because there is very little structure underground, whether natural or man-made, that is blue. The entire conduit 22 may have a blue color, which may be provided by injection molding the conduit 22 from blue plastic. Consequently, the indicator 86 may be easily visible, even when the conduit 22 is partially buried. Apart from use of the indicator 86 to indicate the size of the conduit 22, such a feature makes the conduit 22 easier to see and distinguish from other subterranean objects. Other colors besides blue may, of course, alternatively be used for the indicator 86.

The coupling 20, or more specifically, the body 40, may also have an indicator 88. The indicator 88 indicates the size of the conduit receivable by the coupling 20 to provide a fluid-tight connection. The indicator 86 may thus correspond to the indicator 88 to show that the coupling 20 is compatible with the conduit 22. The indicator 86 may even be substantially the same as the indicator 88. Indicators that are "substantially the same" are indicators that would be visually recognized as pertaining to compatible or corresponding parts. If desired, the body 40 (and/or the remainder of the coupling 20) may be formed of blue plastic, and the conduit 22 may similarly be formed of plastic of the same blue color to indicate that they are connectable to each other. In alternative embodiments, the indicator 88 may be disposed on the release ring 42 in addition to or instead of on the body 40.

Figure 3:
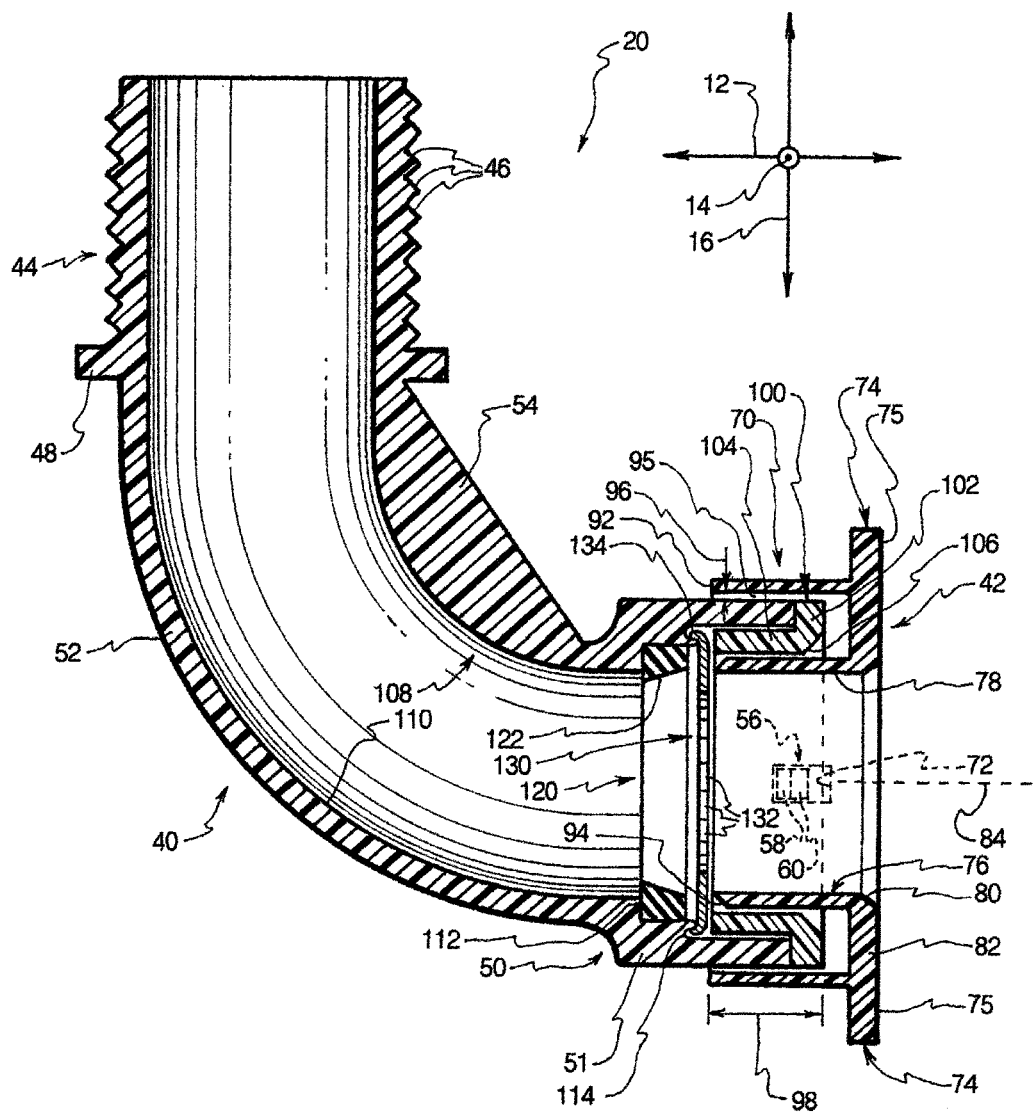
FIG. 3 is an enlarged cross-sectional elevation view of the coupling of FIGS. 1 and 2 in the engaged configuration thereof, wherein the coupling captures the end of any conduit inserted into the coupling.

Referring to FIG. 3, a side elevation, section view illustrates the coupling 20, in isolation from the remainder of the fluid system 10. The coupling 20 is shown in the engaged configuration, as in FIGS. 1 and 2. Features of the interior of the coupling 20 will now be described, in connection with FIG. 3.

As shown, the exterior sleeve 70 of the release ring 42 has a countersink 92, which is oriented generally inward. The interior sleeve 76 also has a countersink 94, which is oriented generally outward. The countersinks 92, 94 are thus both oriented toward the corresponding surfaces of the shoulder 51 to facilitate assembly of the release ring 42 and the body 40.

An annular gap 95 exists between the exterior sleeve 70 and the shoulder 51. The annular gap 95 is dimensioned such that a clearance 96 exists between the exterior sleeve 70 and the shoulder 51. The clearance 96, when applied to both sides of the second end 50 (i.e., the top and bottom sides, with reference to the view of FIG. 3), results in the existence of an overall double of the clearance 96. In order to prevent dirt entry into the annular gap 95, the clearance 96 may advantageously be less than about 0.02 inches. Furthermore, the clearance 96 may advantageously be less than about 0.01 inches, or even less than about 0.005 inches.

If desired, the clearance 96 may be the minimum clearance that still permits installation of the release ring 42 and the body 40. The clearance 96 may alternatively be the maximum clearance that generally keeps dirt from entering the annular gap 95 when the coupling 20 is buried. The tightness of the clearance 96 not only keeps dirt from the annular gap 95, but it also keeps dirt from entering the space inward of the annular wall 82. Thus, the clearance 96 helps to prevent dirt from increasing frictional resistance or direct physical interference with longitudinal motion of the release ring 42 toward the second end 50.

According to one embodiment, the diameter of the shoulder 51 and the inside diameter of the exterior sleeve 70 may have the same nominal value. When the release ring 42 and the body 40 are assembled, the exterior sleeve 70 may be stretched somewhat as the retention features 56 wedge apart opposite sides of the exterior sleeve 70 to slide into the retention slots 72 of the exterior sleeve 70. Thus, the inside diameter of the exterior sleeve 70 may enlarge somewhat to provide the clearance 96. The clearance 96 is then sufficient to permit the release ring 42 to slide with respect to the second end 50, but small enough to restrict dirt entry into the annular gap 95.

The clearance 96 extends for a length 98 of the second end 50 sufficient to avoid dirt entry, and more particularly, to keep dirt from passing through the annular gap 95 to interfere with the sliding motion of the release ring 42. The length 98 may advantageously be over one-quarter inch. In alternative embodiments, the length 98 may be as small as one-eighth of an inch or three-sixteenths of an inch, or as great as one-half inch or three-eighths of an inch. The length 98 shown is when the release ring 42 is positioned to retain the end 24 of the conduit 22, which is the position in which the release ring 42 is normally disposed.

The coupling 20 has a retainer ring 100 in addition to the body 40 and the release ring 42. The retainer ring 100 has a lip 102 that extends outward (i.e., in the lateral and transverse directions 14, 16) adjacent to the edge of the shoulder 51. The retainer ring 100 also has a sleeve 104 extending generally within the second end 50. A countersink 106 is disposed at the juncture of the sleeve 104 with the lip 102 to facilitate assembly of the release ring 42 with the retainer ring 100.

As shown, the body 40 has a bore 108 that extends from the first end 44 to the second end 50. The bore 108 curves along with the bend 52 and, as it passes through the second end 50, shares the axis 84. The bore 108 has a retention portion 110 sized to receive the end 24 of the conduit 22. The retention portion 110 may be sized to press inward against the end 24 in such a manner that the retention portion 110 grips the end 24 to keep the conduit 22 in place. The bore 108 also has a flat step 112 at which the diameter of the bore 108 steps up from that of the retention portion 110. Furthermore, the bore 108 has a lipped step 114 at which the diameter of the bore 108 steps up from that of the region between the flat step 112 and the lipped step 114.

A seal ring 120 is seated against the flat step 112. The seal ring 120 is formed of a resilient material such as rubber. The seal ring 120 has a generally annular shape, with a countersink 122 facing inward and toward the release ring 42. A spring washer 130 is seated against the lipped step 114. The spring washer 130 has a plurality of fingers 132 that extend inward. The spring washer 130 also has a peripheral lip 134 that curls over the lipped step 114 so that the peripheral lip 134 is unable to contract excessively during deflection of the spring washer 130. The configuration of the spring washer 130 will be shown and described with greater clarity in connection with FIG. 4.

The coupling 20 may be fabricated in a variety of ways. According to one method, the body 40, the release ring 42, and the retainer ring 100 are all formed of plastic via injection molding. Blow molding, stamping, or other methods may alternatively be used. The seal ring 120 may be injection molded of an elastomer such as rubber, and the spring washer 130 may be stamped of a metal such as steel, stainless steel, or aluminum.

The seal ring 120 may first be inserted into the bore 108 of the body 40 along the longitudinal direction 12 and seated against the flat step 112 of the bore 108. The spring washer 130 may then be inserted into the bore 108 along the longitudinal direction 12 and seated against the lipped step 114 in such a manner that the peripheral lip 134 of the spring washer 130 engages the lipped step 114.

After the seal ring 120 and the spring washer 130 have been installed, the retainer ring 100 may be inserted into the bore 108 of the body 40 along the longitudinal direction 12 in such a manner that the sleeve 104 of the retainer ring 100 rests directly within the second end 50, as shown in FIG. 3. The sleeve 104 may then abut or be disposed directly adjacent to the peripheral lip 134 of the spring washer 130 so that the retainer ring 100 keeps the spring washer 130 in place. The spring washer 130, in turn, keeps the seal ring 120 in place.

When the retainer ring 100 has been disposed in the position illustrated in FIG. 3, the retainer ring 100 may be ultrasonically welded, thermally welded, adhesive bonded, or otherwise attached to the second end 50. If desired, an annular bead (not shown) may be formed on the lip 102 of the retainer ring 100 at a position such that the annular bead is sandwiched between the lip 102 and the second end 50 when the retainer ring 100 is installed. The annular bead may then fuse with the second end 50 during ultrasonic welding to secure the lip 102 to the second end 50.

When the retainer ring 100 has been secured, the release ring 42 may be inserted into engagement with the second end 50 along the longitudinal direction 12. The release ring 42 is inserted such that the interior sleeve 76 passes through the countersink 106 and into the sleeve 104 of the retainer ring 100. The countersinks 106, 94 cooperate to facilitate insertion and centering of the interior sleeve 76 of the release ring 42 within the sleeve 104 of the retainer ring 100. Simultaneously, the exterior sleeve 70 of the release ring 42 passes around the lip 102 of the retainer ring 100 and around a portion the shoulder 51, as shown in FIG. 3. The countersink 92 of the exterior sleeve 70 aids insertion and centering of the exterior sleeve 70 around the lip 102 and the second end 50.

As the sleeves 70, 76 engage the retainer ring 100 and the second end 50, the exterior sleeve 70 expands in the lateral direction 14 to pass around the retention feature 56, as described previously. The ramps 60 are positioned such that the release ring 42 is able to be inserted longitudinally over the second end 50 so that the ramps 60 cause the exterior sleeve 70 to expand in the lateral direction 14, thereby permitting continued motion of the release ring 42 in the longitudinal direction 12. The exterior sleeve 70 extends around the retention features 56 until the retention features 56 are captured within the retention slots 72 of the exterior sleeve 70. If desired, the exterior sleeve 70 may have interior grooves (not shown) extending from the retention slots 72 to the countersink 92 to facilitate passage of the exterior sleeve 70 over the retention features 56.

Once the retention slots 72 have moved far enough to capture the retention features 56, the coupling 20 is fully assembled and ready for use. The spring washer 130 exerts pressure on the countersink 94 of the interior sleeve 76 of the release ring 42 to urge the release ring 42 to remain positioned as in FIG. 3, so that the coupling 20 remains in the engaged configuration. The engagement of the retention features 56 with the retention slots 72 keeps the release ring 42 from moving further from the body 40 and the retainer ring 100.

The end 24 of the conduit 22 may be easily engaged within the coupling 20. More precisely, the end 24 may be inserted into the bore 78 of the interior sleeve 76 along the longitudinal direction 12. The end 24 may be pushed deeper into the coupling 20 so that the end 24 passes through the spring washer 130, thereby causing the fingers 132 of the spring washer 130 to deflect outward (i.e., in the lateral and transverse directions 14, 16), and toward the retention portion 110 of the bore 108 of the body 40. The end 24 then passes through the seal ring 120 and may optionally be pushed into the retention portion 110 until the outer wall of the end 24 abuts the retention portion 110.

Alignment of the end 24 with the seal ring 120 during insertion is facilitated by the countersink 122 of the seal ring 120. The seal ring 120 presses against the end 24 to form a substantially fluid-tight seal (i.e., a watertight seal in the context of an irrigation system). The seal keeps fluid from leaking out of the coupling 20 through the second end 50 at pressure differentials up to the maximum operating pressure of the fluid system 10. Accordingly, fluid loss can be avoided without complicating the process of attaching the end 24 to the coupling 20.

When the end 24 is disposed within the retention portion 110, the spring washer 130 is deflected in such a manner that, if the conduit 22 is drawn longitudinally outward, the fingers 132 seat themselves in the conduit 22 to prevent withdrawal of the end 24 from the coupling 20. Hence, the end 24 cannot be withdrawn from within the coupling 20 without moving the coupling 20 to the disengaged configuration, which will be shown and described subsequently, in connection with FIG. 4.

Figure 4:
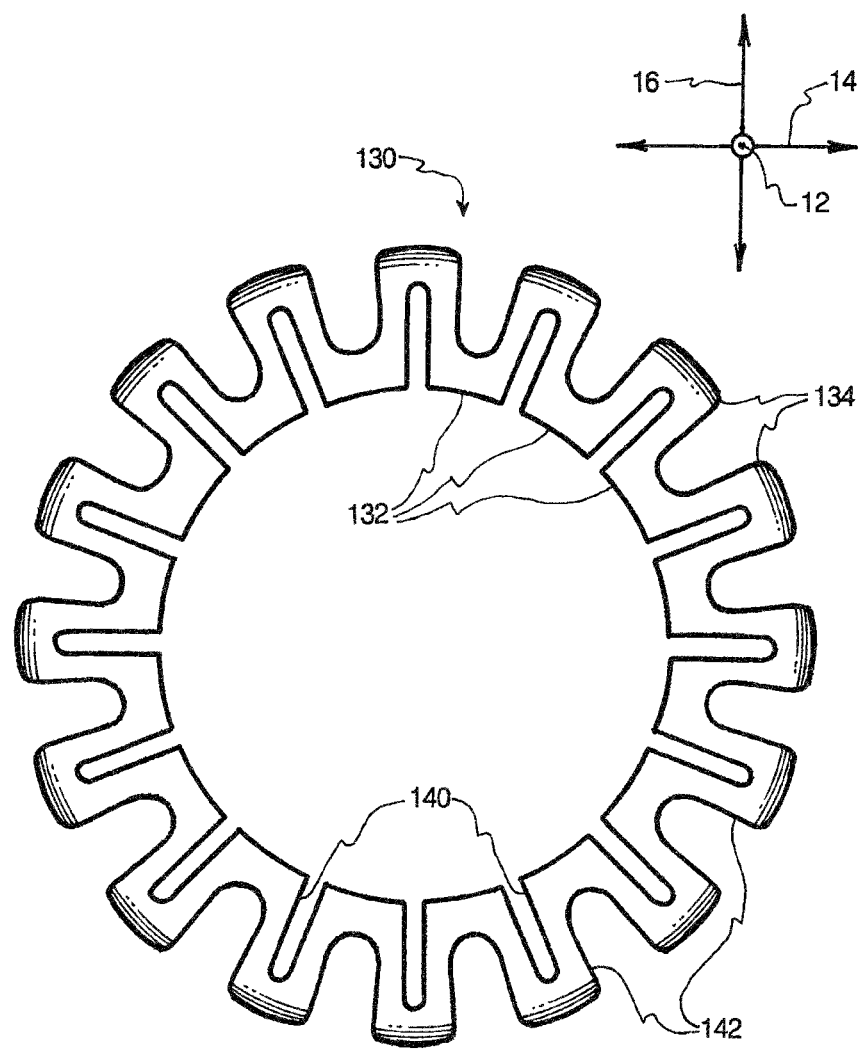
FIG. 4 is a front elevation view of a spring washer disposed within the coupling of FIGS. 1-3

Referring to FIG. 4, a front elevation view illustrates the spring washer 130 in isolation, in substantially undeflected form. As shown, the fingers 132 extend inward from the peripheral lip 134. The peripheral lip 134 extends in the longitudinal direction 12, i.e., toward the retention portion 110 of the bore 108 of the body 40 (shown in FIG. 3). In this application, "finger" does not denote any specific shape or length-to-width ratio. Rather, a "finger" is simply an extension. In alternative embodiments, a spring washer may have fewer fingers, each of which extends around a substantial portion of the diameter of the end 24. For example, only two fingers, each of which has a near-semicircular profile, may be disposed on either side of such a spring washer to retain the end 24.

Returning to the embodiment of FIG. 4, the spring washer 130 has a plurality of interior slots 140 that separate the fingers 132 from each other. The interior slots 140 are arrayed in generally radial fashion. The spring washer 130 also has a plurality of exterior slots 142 that facilitate flexing of the fingers 132 in the longitudinal direction 12 and enable the peripheral lip 134 to maintain its size and engagement with the lipped step 114 during flexing of the fingers 132.

Figure 5:
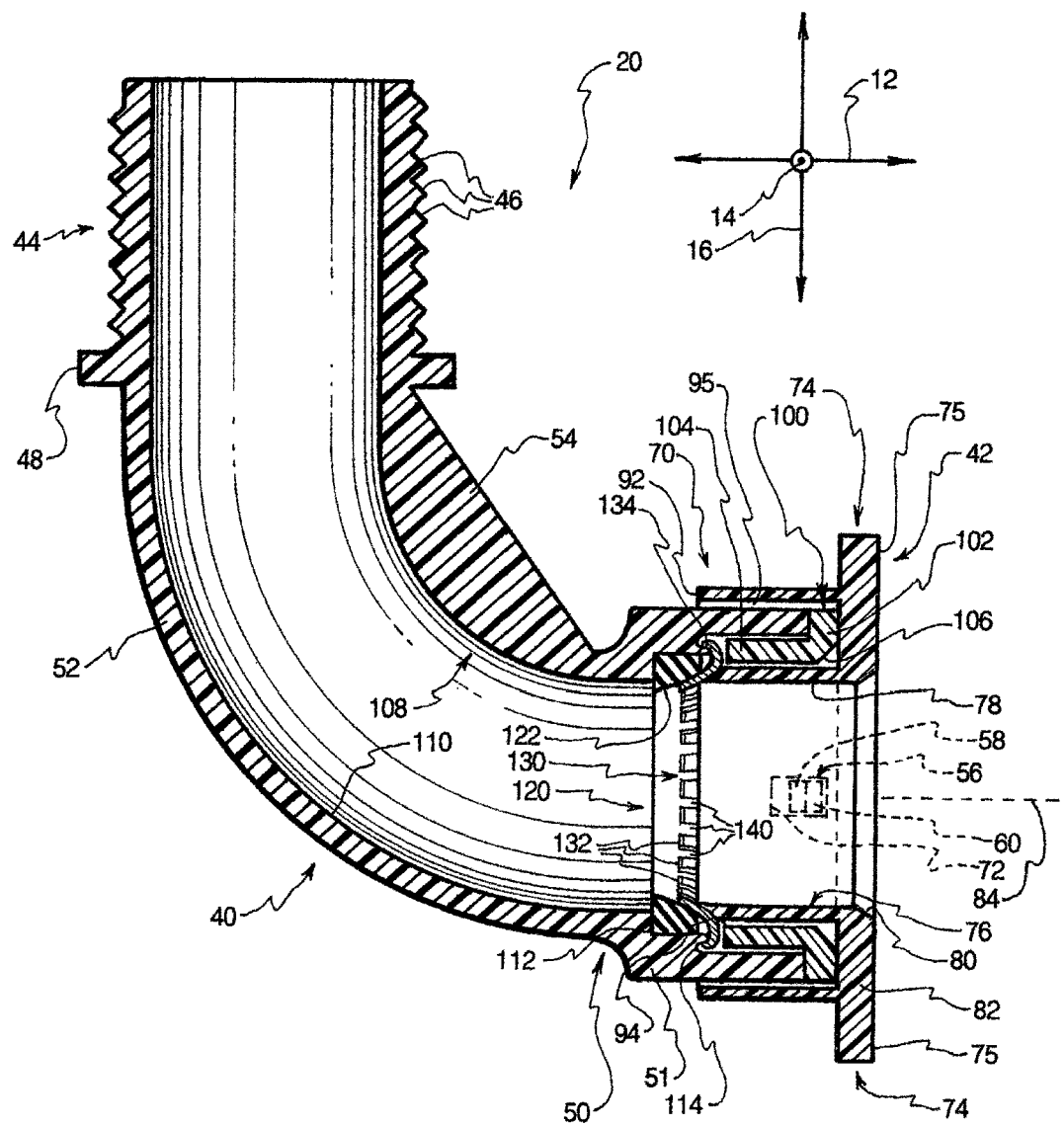
FIG. 5 is an enlarged cross-sectional elevation view of the coupling of FIGS. 1-3 in the disengaged configuration thereof, wherein the end of any conduit captured in the coupling is released therefrom.

Referring to FIG. 5, a side elevation, section view illustrates the coupling 20 in the disengaged configuration. The release ring 42 is simply actuated longitudinally toward the retainer ring 100 by, for example, holding the body 40 and pressing the release grips 74 of the release ring 42 toward the body 40. The interior sleeve 76 of the release ring 42 moves further into the bore 108 and the countersink 94 of the interior sleeve 76 presses against the spring washer 130.

The release ring 42 may move longitudinally until the annular wall 82 of the release ring 42 abuts the lip 102 of the retainer ring 100. At this point, the retention slots 72 have moved such that the retention features 56 are disposed at the opposite end of the retention slots 72 from their position in the engaged configuration.

In response to pressure from the countersink 94 of the interior sleeve 76, the fingers 132 deflect toward the retention portion 110 of the bore 108, as illustrated in FIG. 5. The fingers 132 simultaneously bend outward to define a diameter larger than the outside diameter of the conduit 22. Thus, the fingers 132 no longer seat in the conduit 22, and the end 24 of the conduit 22 can be freely withdrawn along the longitudinal direction 12 from the bore 108.

The release ring 42 may then be released to permit the coupling 20 to return to the disengaged configuration. Then, the conduit 22 or a different conduit may then be coupled or re-coupled via insertion into the bore 108, as described previously.

Figure 6:
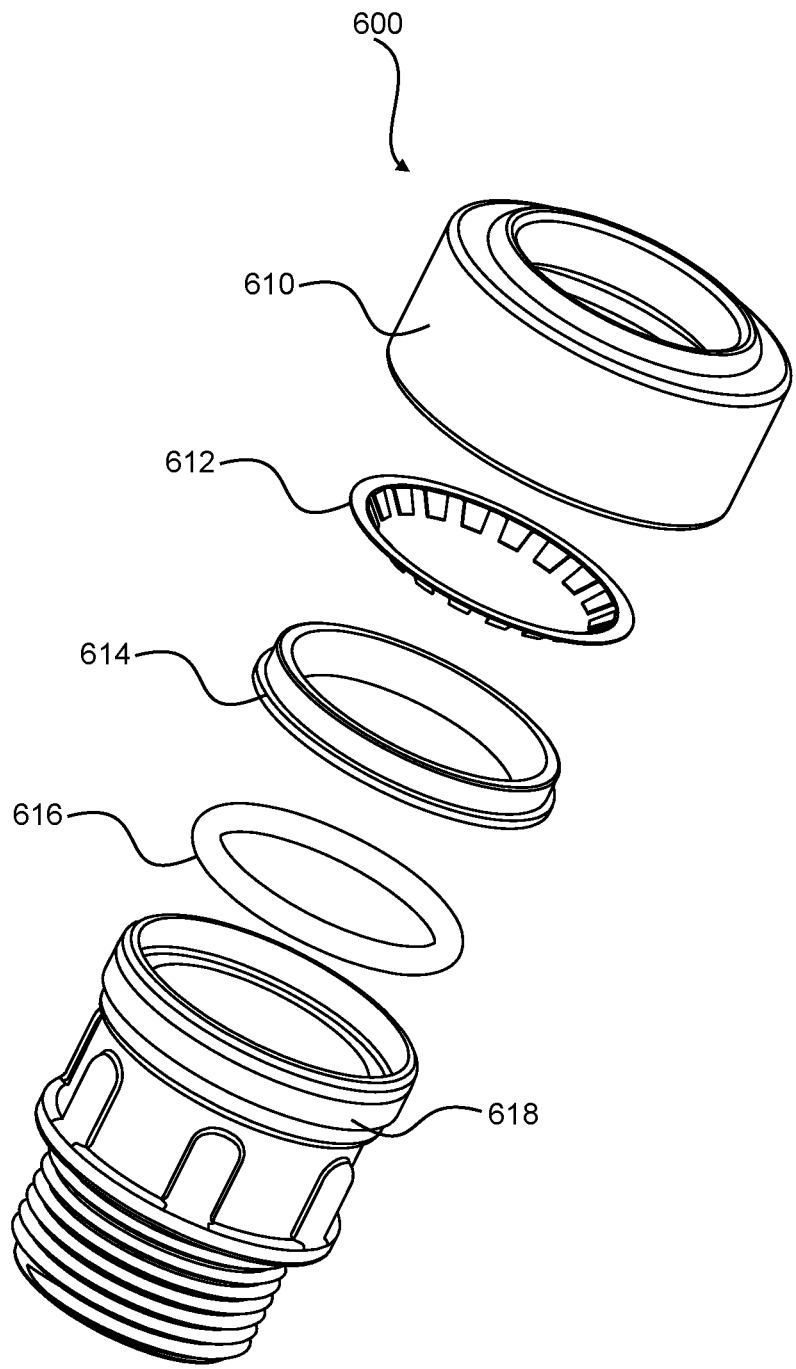
FIG. 6 is an exploded view of an alternative embodiment of a coupling.

FIG. 6 is an exploded view of an alternative embodiment of a coupling 600. The illustrated coupling 600 includes a first member 610, a gripping ring 612, a support ring 614, an O-ring 616, and a second member 618. The components 610-618 of the coupling 600 may be embodied in various ways within the scope of the disclosed subject matter and, as such, the components 610-618 are provided only for illustrative purposes.

Figures 7A, 7B:
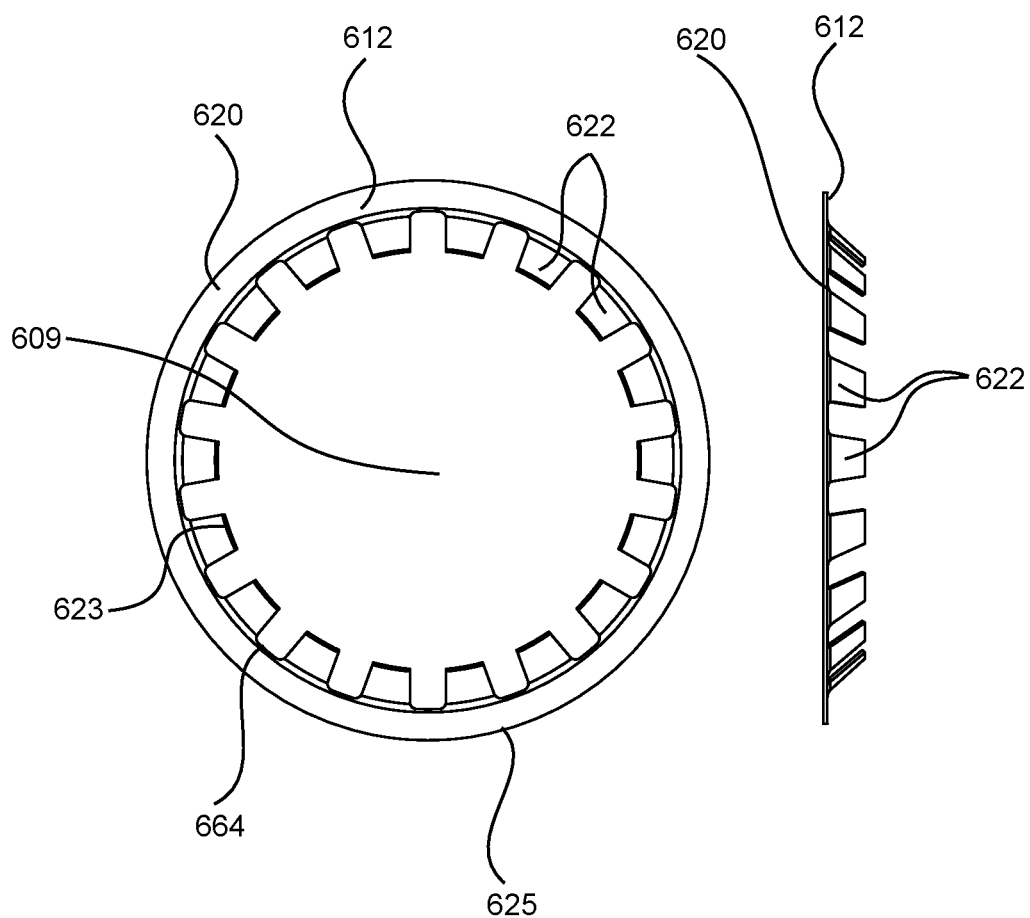
FIG. 7A is a top view of one embodiment of a gripping ring of the embodiment of the coupling of FIG. 6.
FIG. 7B is a side view of the gripping ring shown in FIG. 7A.

FIG. 7A is a top view of one embodiment of a gripping ring 612, and FIG. 7B is a side view of this embodiment of the gripping ring 612. An inner edge 664 of the gripping ring 612 defines a series of teeth 622. The teeth 622 project inwardly toward the center 609 of the gripping ring 612. As illustrated, the teeth 622 have a square inward tooth edge 623. Alternatively, for example, the teeth 622 may have a rounded inward tooth edge or a serrated inward tooth edge with multiple inward projections (not illustrated).

The teeth 622 may engage a conduit 22 (shown in FIG. 2) when the conduit 22 is disposed within the coupling 600. In particular, the teeth 622 may engage the outer surface 23 of the insertion end 24 of the conduit 22 (illustrated in FIG. 2). As explained previously, the outer surface 23 of the insertion end 24 of the conduit 22 may be smooth and free of grooves, flanges, and beads.

The teeth 622, as illustrated in FIG. 7B, are disposed at an angle with respect to an outer body 620 of the gripping ring 612. The angle of the teeth 622 relative to the outer body 620 enables the teeth 622 to better engage the conduit 22.

As illustrated in FIG. 7A, the outer body 620 has a generally annular shape with a rounded outer edge 625. The outer body 620 provides support for the teeth 622 and enables engagement between the gripping ring 612 and the first member 610.

Figure 8:
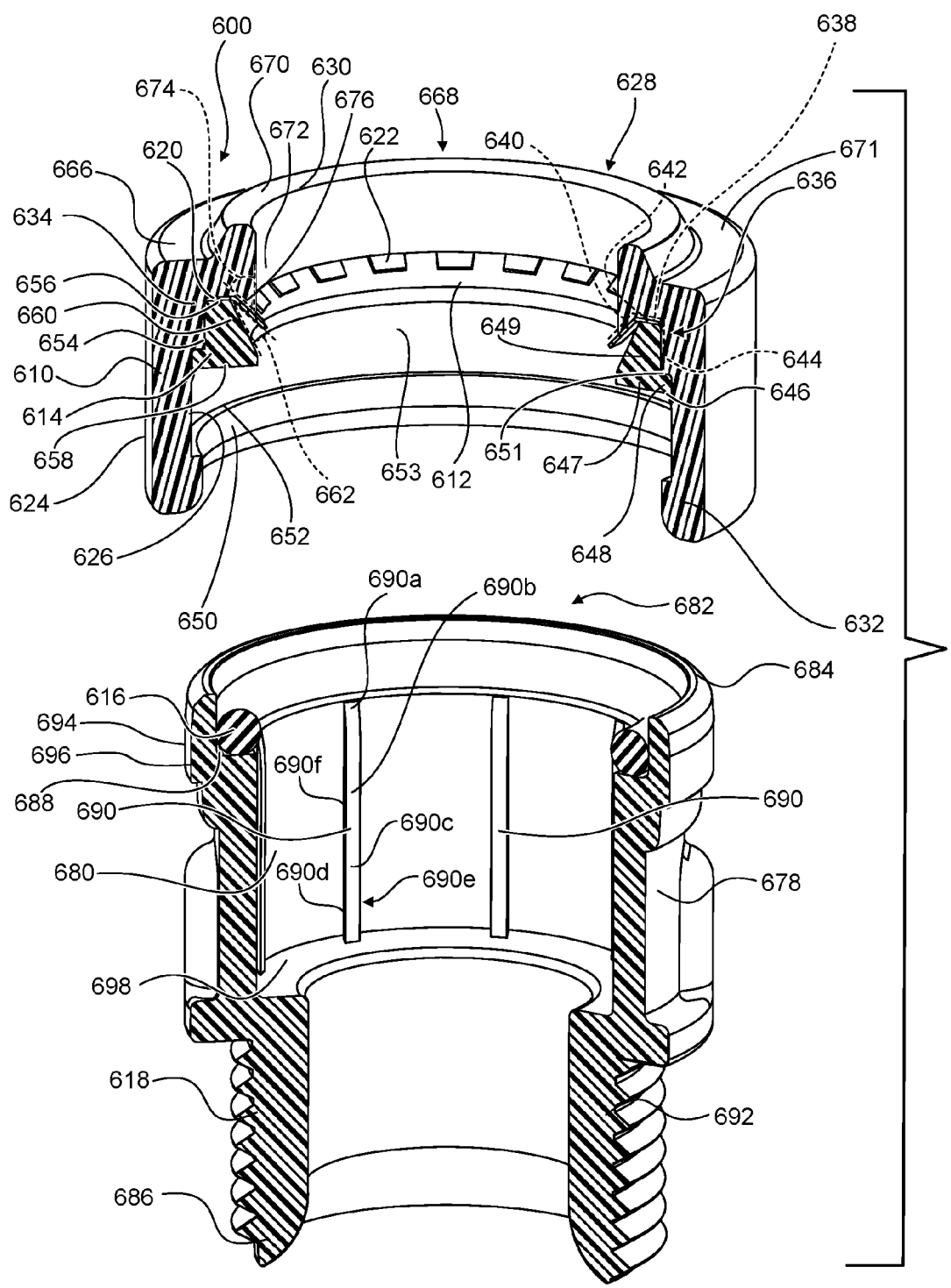
FIG. 8 is a partial cutaway and a partially exploded view of the coupling shown in FIG. 6.

FIG. 8 is a partially exploded and partially cutaway view of the coupling 600. As illustrated in FIG. 8, the gripping ring 612 and the support ring 614 may be rotatably disposed within the first member 610. In particular, the gripping ring 612 and the support ring 614 may be disposed within the circular recess 636 of the first member 610. Use of a separate support ring 614 reduces the cost of manufacturing the coupling 600. Also, rotation of the support ring 614 independent of the first and second members 610, 618 facilitates enhanced engagement between the coupling 600 and conduit 22.

The circular recess 636 may be defined by a recess defining portion 634 of an interior surface 626 of the first member 610. The recess defining portion 634 may comprise a J-shaped cross-sectional perimeter 638 (generally identified by dashed lines in FIG. 8). The J-shaped cross-sectional perimeter 638 may be generally in the shape of a hook or "J" and may comprise a first angled face 640 (generally identified by a dashed line in FIG. 8), a short face 642 (generally identified by a dashed line in FIG. 8), and a long face 644 (generally identified by a dashed line in FIG. 8). The first angled face 640, a short face 642, and the long face 644 may be linear, as illustrated in FIG. 8, or maybe nonlinear. The short face 642 is disposed adjacent to the entry end 630 of the first member 610 and thus may be referred to as an adjacent face 642, while the long face 644 is disposed toward the outside or exterior of the first member 610 and thus may be referred to as an outside face 644. In one embodiment, the short face 642 may be longer than the long face 644. As illustrated in FIG. 8, the first angled face 640 may be disposed at an angle between 180° and 90° relative to the short face 642. In contrast, the short face 642 may be disposed at approximately a 90° angle relative to the long face 644.

An acute extension 676 of the first member 610 may define the first angled face 640. The first angled face 640 may be disposed at an acute angle 674 (generally identified by dashed lines in FIG. 8) with respect to a mouth region 672 of the first member 610 to form the acute extension 676. When the gripping ring 612 is disposed within the circular recess 636, the outer body 620 of the gripping ring 612 may abut the short face 642 of the J-shaped cross-sectional perimeter 638.

In one embodiment (as illustrated in FIG. 8), the teeth 622 of the gripping ring 612 may abut the first angled face 640 of the J-shaped cross-sectional perimeter 638 when the coupling 600 is in an unengaged position (i.e., not engaged with a conduit 22). When the teeth 622 engage a conduit 22, the teeth 622 may be drawn away from the first angled face 640 such that there is a space between at least a portion of each tooth 622 and the first angled face 640 depending on the direction of forces applied to the conduit 22 and the coupling 600.

As illustrated in FIG. 8, the support ring 614 may also be disposed within the circular recess 636. In one embodiment, the support ring 614 may include a proximal face 656, an exterior surface 654, an outward extension 648 defined by the exterior surface 654, a distal face 658, and a second angled face 660. The proximal face 656 and distal face 658 may be generally parallel. In contrast, the second angled face 660 may be nonparallel with respect to the exterior surface 654 (when seen from the cross-sectional view illustrated in FIG. 8) such that the support ring 614 generally increases in width from the proximal face 656 to the distal face 658. In various embodiments the second angled face 660 may be referred to as an interior angled face 660. Additionally, the region including the outward extension 648 may be referred to as a region of greater constant radius 647, while a narrowed region may be referred to as a region of lesser constant radius 649. A step 651 may be disposed intermediate the region of greater constant radius 647 and the region of lesser constant radius 649. As a result, in various embodiments, the distal face 658 may be wider than the proximal face 656. The outward extension 648 may be generally annular in shape such that the outward extension 648 generally extends outwardly from the remaining portion of the exterior surface 654 of the support ring 614. Thus, the outward extension 648 is of a greater diameter than the remaining portions of the support ring 614 defined by the exterior surface 654.

When the support ring 614 is positioned within the first member 610, the outward extension 648 of the support ring 614 may engage and mate with a recessed region 646 of the first member 610. In such a condition, the proximal face 656 of the support ring 614 may abut the outer body 620 of the gripping ring 612, and the exterior surface 654 of the support ring 614 may abut the long face 644 of the J-shaped cross-sectional perimeter 638. As illustrated, the second angled face 660 of the support ring 614 may be disposed at an acute angle 662 (generally identified by dashed lines in FIG. 8) relative to the first angled face 640 of the J-shaped cross-sectional perimeter 638 when the coupling 600 is in an unengaged position. In an engaged position, pressures on an engaged conduit 22 and on the coupling 600 may push the first angled face 640 and the second angled face 660 closer or farther apart than illustrated in FIG. 8.

The illustrated first member 610 includes an exterior surface 624 and an interior surface 626. The interior surface 626 defines a first passageway 628 into which a conduit 22 may be inserted via an entry opening 668 and the mouth region 672 of the first member 610. The first passageway 628 may extend from an entry end 630 to a securing end 632 of the first member 610. The first member also includes an entry face 666. The entry face 666 may optionally include a raised inner portion 670 that surrounds the entry opening 668. The raised inner portion 670 may be surrounded by a recessed outer portion 671. The raised inner portion 670 increases the stability of a conduit 22 inserted within the coupling 600 thereby enhancing the seal between the conduit 22 and the coupling 600.

The first member 610 may also include an entry end 630 and the securing end 632. A conduit 22 is inserted through the entry end 630, while the securing end 632 is used to secure the first member 610 to the second member 618. Accordingly, when the first member 610 is secured to the second member 618, the securing end 632 may be disposed closer to the second member 618 than the entry end 630.

The first member 610 may also include a recessed engaging region 653 and an inward extension 650 that includes an engaging inward edge 652. These components enable a snap-fit engagement between the first member 610 and the second member 618. In particular, an outward annular extension 694 of the second member 618 is received into the recessed engaging region 653 of the first member 610. The outward engaging edge 696 of the second member 618 engages the engaging inward edge 652 of the first member 610 to maintain the first member 610 and the second member 618 in an interlocked state.

As illustrated in FIG. 8, the O-ring 616 is disposed within the second member 618. In particular, the O-ring 616 is disposed within the annular recess 688 of the second member 618. The annular recess 688, as illustrated, is disposed at an attachment end 684 of the second member 618.

The O-ring 616 may be embodied in various ways. For example, the O-ring 616 may have a round cross-sectional shape, as illustrated in FIG. 8. Alternatively, the O-ring 616 could have an oval, square, or rectangular cross-sectional shape.

The second member 618 includes an attachment end 684 and an opposite end 686. The attachment end 684 is received within the securing end 632 of the first member 610. In an alternative embodiment (not illustrated), the securing end 632 of the first member 610 is received within the attachment end 684 of the second member 618.

The second member 618 also includes an exterior surface 678 and an interior surface 680. The outward annular extension 694 and outward engaging edge 696, as mentioned above, are defined by the exterior surface 678 of the second member 618. In addition, the exterior surface 678 defines a threaded region 692. As illustrated, the threaded region 692 includes outward extending threads. In an alternative embodiment (not illustrated), the threaded region 692 may include inwardly extending threads or other securing mechanisms (such as features for facilitating a snap engagement with another component). In addition, adhesives or clamps may be used to secure the second member 618 to another component if, for example, the threaded region 692 is replaced with a smooth outer surface.

The interior surface 680 may define a series of tapered inward protrusions 690. The tapered inward protrusions 690 increase in depth, at least in certain portions, from the attachment end 684 to the opposite end 686. As illustrated in FIG. 8, each of the tapered inward protrusions 690 may include an inclined region 690a, which increases in depth relative to adjacent areas of the interior surface 680, and a flat region 690b, which maintains a generally constant depth relative to adjacent areas of the interior surface 680. In various embodiments, the inclined region 690a may be referred to as a radially inward protruding inclined region 690a, and the flat region 690b may be referred to as a radially inward protruding flat region 690b. The flat region 690b may comprise a planar surface 690c. Each of the tapered inward protrusions 690 may comprise two peripheral edges 690d-e forming sidewalls of the protrusion 690. In addition, each peripheral edge 690d-e may comprise an inward radial dimension 690f that, as the name suggests, extends radially inward. The tapered inward protrusions 690 aid in centering a conduit 22 received within the coupling 600 and thus enhance a seal between the coupling 600 and a conduit 22 (i.e., enhances a seal between the conduit 22 and the O-ring 616). The tapered inward protrusions 690 may also serve to keep dirt and debris off the conduit 22 to further enhance the seal between the coupling 600 and conduit 22.

In addition, the interior surface 680 may also define a second passageway 682 within the second member 618. The second passageway 682 may extend from an attachment end 684 to an opposite end 686 of the second member 618. The second passageway 682 includes a stop surface 698. The stop surface 698 abuts a conduit 22 positioned within the coupling 600. The stop surface 698, in some embodiments, may have the shape of a disk with a central opening. In various embodiments, the flat region 690b may extend from the stop surface 698 to the inclined region 690a. As illustrated, the stop surface 698 may be disposed at a generally perpendicular angle and contiguous with respect to the planar surface 690c of the flat region 690b of each of the tapered inward protrusions 690. Also, for each of the tapered inward protrusions 690, the flat region 690b may be contiguous with the inclined region 690a. As further illustrated in FIG. 8, for each of the tapered inward protrusions 690, the flat region 690b may be contiguous with the inclined region 690a and may extend from the inclined region 690a toward the stop surface 698. The stop surface 698, like the tapered inward protrusions 690, aides in maintaining the conduit 22 properly positioned within the coupling 600 to further enhance the seal between the conduit 22 and the O-ring 616.

Figure 9:
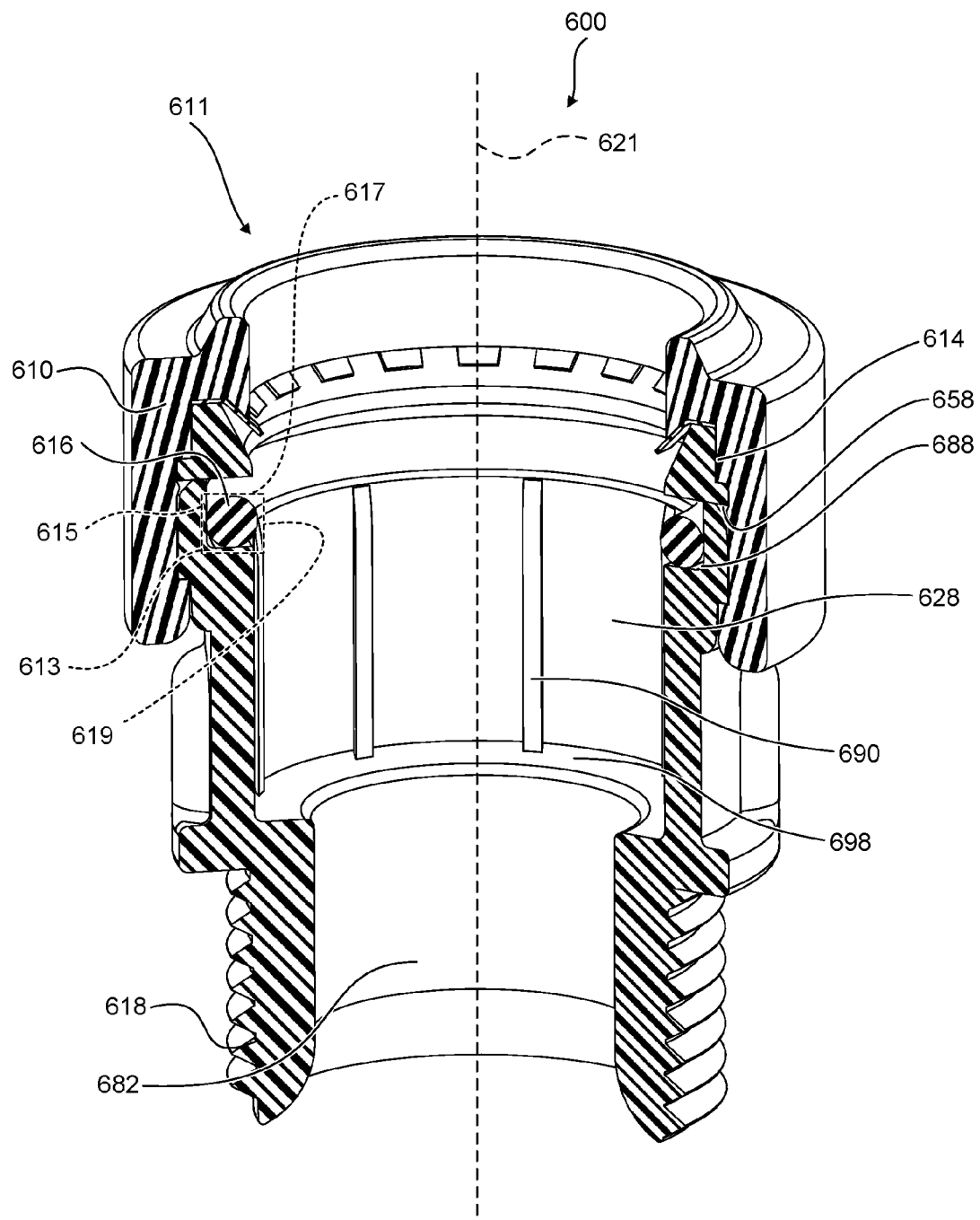
FIG. 9 is a partial cutaway view of the coupling of FIG. 6.

FIG. 9 is a partial cutaway view of the coupling 600 shown in FIG. 8. As illustrated in FIG. 9, the first member 610 is secured to the second member 618. In this state, the first passageway 628 of the first member 610 is in fluid communication with the second passageway 682 of the second member 618 and thus form a coupling passageway 611.

The coupling 600 may further comprise a longitudinal axis 621. As illustrated, the tapered inward protrusion 690 may be generally parallel to the longitudinal axis 621. In contrast, the stop surface 698 may be generally perpendicular to the longitudinal axis 621. The coupling passageway 611 may extend along a longitudinal axis 621 of the coupling 600.

As illustrated, the second member 618 encloses only a first and a second quadrant 613, 615 (generally identified by dashed lines in FIG. 9) of the annular recess 688. A third quadrant 617 (generally identified by a dashed line in FIG. 9) of the annular recess 688 is enclosed by the distal face 658 of the support ring 614. The fourth quadrant 619 (generally identified by a dashed line in FIG. 9) of the annular recess 688 is left exposed to enable free engagement of the O-ring 616 with a conduit 22 disposed within the coupling 600.

Figure 10:
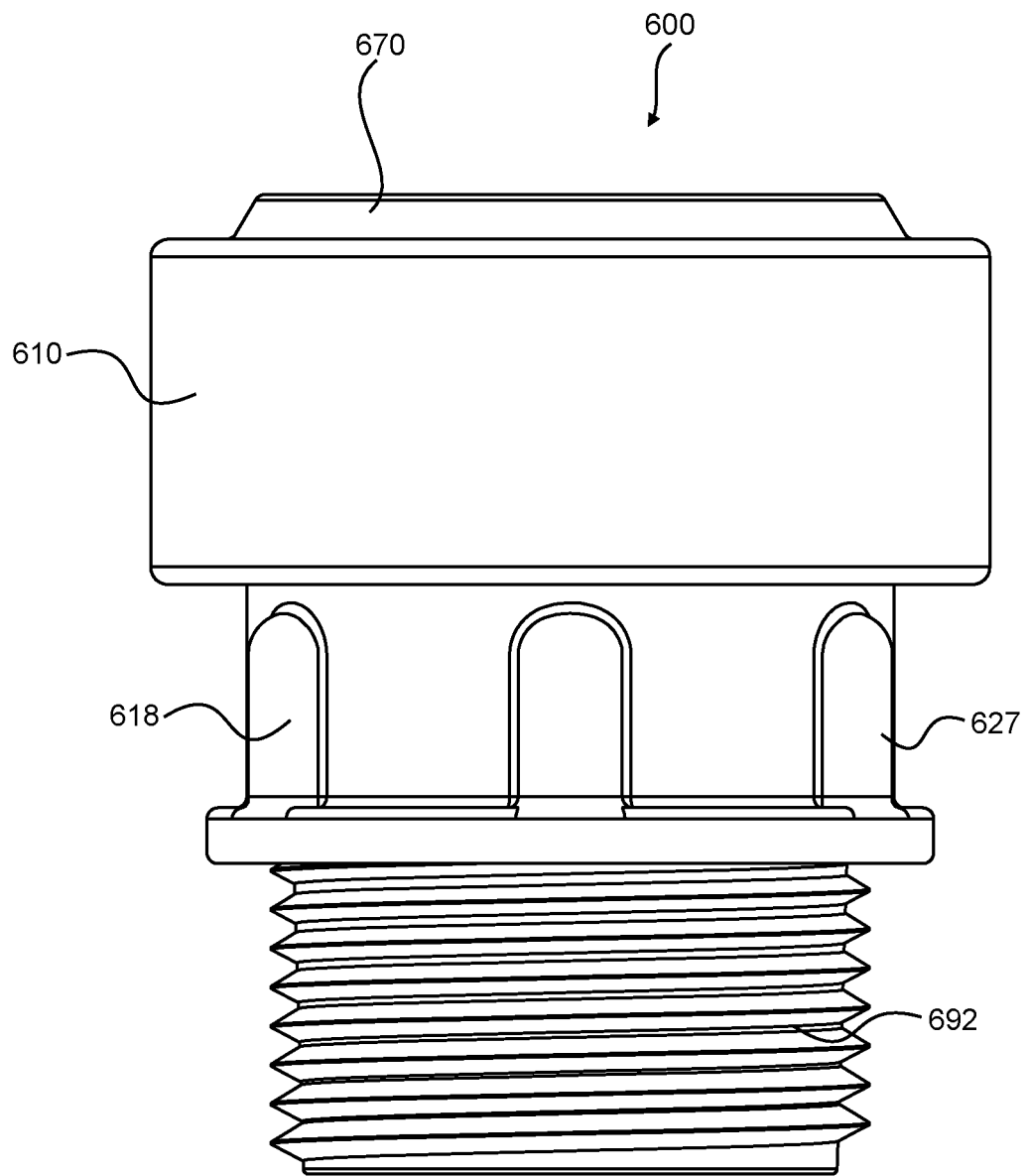
FIG. 10 is a side view of the coupling of FIG. 6.

FIG. 10 is a side view of the coupling 600 shown in FIG. 9. In this figure, the first member 610 is secured to the second member 618. This figure also illustrates the threaded region 692 and the raised inner portion 670 of the coupling 600. FIG. 10 further illustrates ribs 627 that may provide added strength to the coupling 600 and also facilitate gripping and rotation of the coupling 600 by a user.

With reference to FIG. 6-10, the coupling 600 may be manufactured in a number of different ways. For example, such a method may comprise:

positioning the O-ring 616 within the annular recess 688 of the second member 618 such that the second member 618 encloses two 613, 615 of four quadrants 613, 615, 617, 619 of the annular recess 688, as illustrated FIG. 9;

positioning the gripping ring 612 within the circular recess 636 of the first member 610, as illustrated in FIG. 8;

positioning the support ring 614 within the circular recess 636 of the first member 610 such that the proximal face 656 of the support ring 614 abuts the gripping ring 612, as illustrated in FIG. 8; and placing the first member 610 in snap fit engagement with the second member 618 such that the distal face 658 of the support ring 614 encloses the third 617 of the four quadrants 613, 615, 617, 619 of the annular recess 688, as illustrated in FIGS. 9 and 10.

Positioning the gripping ring 612 within the circular recess 636 of the first member 610 may comprise positioning the outer body 620 of the gripping ring 612 such that the outer body 620 of the gripping ring 612 abuts the short face 642 and the series of teeth 622 of the gripping ring 612 abut the first angled face 640 of the generally J-shaped cross-sectional perimeter 638.

Positioning the support ring 614 within the circular recess 636 of the first member 610 may comprise positioning the support ring 614 within the circular recess 636 such that the proximal face 656 of the support ring 614 abuts the outer body 620 of the gripping ring 612 and the exterior surface 654 of the support ring 614 abuts the long face 644 of the J-shaped cross-sectional perimeter 638.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying methods claim the present elements of the various steps is a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein, but is to be accorded the widest scope consistent with the principles and novel features disclosed herein.

What is claimed is:

1. A coupling for conveying fluid between a component of a fluid system and an insertion end of a conduit, an outer surface of the insertion end of the conduit being smooth and free of grooves, flanges and beads, said coupling comprising:
 a first member having an exterior surface and an interior surface, the interior surface of the first member defining a first passageway through the first member, the first passageway extending from an entry end to a securing end of the first member, the interior surface of the first member further comprising a recess defining portion, wherein the recess defining portion defines a circular recess and has a generally J-shaped cross-sectional perimeter having a long face, a short face and a first angled face, the first angled face being disposed at an obtuse angle with respect to the short face;
 a second member in snap fit engagement with the first member, the second member having an exterior surface and an interior surface, the interior surface of the second member defining a second passageway through the second member, the second passageway extending from an attachment end to an opposite end of the second member, the interior surface of the second member further defining an annular recess at the attachment end of the second member, the interior surface of the second member further defining a plurality of tapered inward protrusions and a stop surface, wherein the coupling comprises a longitudinal axis, the tapered inward protrusions being generally parallel with the longitudinal axis, each of the tapered inward protrusions comprising a radially inward protruding inclined region, a radially inward protruding flat region which has a planar surface, and two peripheral edges forming sidewalls of the protrusion, each peripheral edge comprising an inward radial dimension,
  for each of the tapered inward protrusions, the inward radial dimension increases along the longitudinal axis from the annular recess to the opposite end of the second member within the inclined region, the inward radial dimension remaining constant along the longitudinal axis within the flat region, the inclined region being disposed intermediate the flat region and the annular recess of the second member along the longitudinal axis of the second member,
  the stop surface being generally perpendicular to the longitudinal axis of the second member and having a shape of a disk with a central opening, the stop surface being disposed at a generally perpendicular angle and contiguous with respect to the planar surface of the flat region of each of the tapered inward protrusions, wherein, for each of the tapered inward protrusions, the flat region is contiguous with the inclined region;
 a gripping ring having an inner edge defining a series of teeth, the gripping ring being disposed within the circular recess of the first member;
 a support ring being disposed within the circular recess of the first member, the support ring having a proximal face that abuts the gripping ring and a distal face that encloses a portion of the annular recess; and
 an O-ring disposed within the annular recess.

2. A coupling for conveying fluid between a component of a fluid system and an insertion end of a conduit, an outer surface of the insertion end of the conduit being smooth and free of grooves, flanges and beads, said coupling comprising:
 a first member having an exterior surface and an interior surface, the interior surface of the first member defining a first passageway through the first member, the first passageway extending from an entry end to a securing end of the first member, the interior surface of the first member further comprising a recess defining portion, wherein the recess defining portion defines a circular recess and has a J-shaped cross-sectional perimeter having a long face, a short face and a first angled face, the first angled face being disposed at an obtuse angle with respect to the short face;
 a second member in snap fit engagement with the first member, the second member having an exterior surface and an interior surface, the interior surface of the second member defining a second passageway through the second member, the second passageway extending from an attachment end to an opposite end of the second member, the interior surface of the second member further defining an annular recess at the attachment end of the second member, the interior surface of the second member further defining a plurality of tapered inward protrusions and a stop surface, wherein the coupling comprises a longitudinal axis, the tapered inward protrusions being generally parallel with the longitudinal axis, each of the tapered inward protrusions comprising a radially inward protruding inclined region, a radially inward protruding flat region which has a planar surface, and two peripheral edges forming sidewalls of the protrusion, each peripheral edge comprising an inward radial dimension,
  for each of the tapered inward protrusions, the inward radial dimension increases along the longitudinal axis from the annular recess to the opposite end of the second member within the inclined region, the inward radial dimension remaining constant along the longitudinal axis within the flat region, the inclined region being disposed intermediate the flat region and the annular recess of the second member along the longitudinal axis of the second member,
  the stop surface being generally perpendicular to the longitudinal axis of the second member and having a shape of a disk with a central opening, the stop surface being disposed at a generally perpendicular angle and contiguous with respect to the planar surface of the flat region of each of the tapered inward protrusions, wherein, for each of the tapered inward protrusions, the flat region is contiguous with the inclined region;
 a gripping ring having an inner edge defining a series of teeth, the gripping ring being disposed within the circular recess of the first member;
 a support ring being disposed within the circular recess of the first member, the support ring having a proximal face that abuts the gripping ring, a distal face that encloses a portion of the annular recess, and an interior angled face and an exterior surface, the exterior surface being radially outward relative to the interior angled face, the exterior surface defining a region of lesser constant radius and a region of greater constant radius and a step intermediate the region of lesser constant radius and the region of greater constant radius, the region of greater constant radius being contiguous with the distal face, the region of greater constant radius being disposed intermediate the region of lesser constant radius and the attachment end of the second member, the attachment end of the second member abutting the distal face of the support ring; and an O-ring disposed within the annular recess.

3. The coupling of claim 2, wherein the gripping ring comprises an outer body, and wherein the outer body of the gripping ring abuts the short face and the series of teeth of the gripping ring abut the first angled face when the coupling is in an unengaged position, the unengaged position comprising a position in which no conduit is engaged with the gripping ring of the coupling.

4. The coupling of claim 2, wherein the exterior surface of the support ring abuts the long face of the J-shaped cross-sectional perimeter.

5. The coupling of claim 2, wherein the first passageway is in fluid communication with the second passageway to form a coupling passageway.

6. The coupling of claim 5, wherein the coupling passageway extends along the longitudinal axis of the coupling.

7. The coupling of claim 2, wherein the entry end of the first member includes an entry face defining an entry opening, the entry face comprising a raised portion surrounding the entry opening.

8. The coupling of claim 2, wherein the interior surface of the first member further defines a mouth region, the first angled face being disposed at an acute angle relative to the mouth region, the first angled face and the mouth region defining an acute extension of the first member.

9. A coupling for conveying fluid between a component of a fluid system and an insertion end of a conduit, an outer surface of the insertion end of the conduit being smooth and free of grooves, flanges and beads, said coupling comprising:
  a first member having an exterior surface and an interior surface, the interior surface of the first member defining a first passageway through the first member, the first passageway extending from an entry end to a securing end of the first member, the interior surface of the first member further comprising a recess defining portion, wherein the recess defining portion defines a circular recess and has a generally J-shaped cross-sectional perimeter having a long face, a short face and a first angled face, the first angled face being disposed at an obtuse angle with respect to the short face, the short face being disposed radially intermediate the long face and the first angled face;
  a second member in snap fit engagement with the first member, the second member having an exterior surface and an interior surface, the interior surface of the second member defining a second passageway through the second member, the second passageway extending from an attachment end to an opposite end of the second member, the interior surface of the second member further defining an annular recess at the attachment end of the second member, the interior surface of the second member further defining a plurality of tapered inward protrusions and a stop surface, wherein the coupling comprises a longitudinal axis, the tapered inward protrusions being generally parallel with the longitudinal axis, each of the tapered inward protrusions comprising a radially inward protruding inclined region, a radially inward protruding flat region which has a planar surface, and two peripheral edges forming sidewalls of the protrusion, each peripheral edge comprising an inward radial dimension,
  for each of the tapered inward protrusions, the inward radial dimension increases along the longitudinal axis from the annular recess to the opposite end of the second member within the inclined region, the inward radial dimension remaining constant along the longitudinal axis within the flat region, the inclined region being disposed intermediate the flat region and the annular recess of the second member along the longitudinal axis of the second member,
  the stop surface being generally perpendicular to the longitudinal axis of the second member and having a shape of a disk with a central opening, the stop surface being disposed at a generally perpendicular angle with respect to the planar surface of the flat region of each of the tapered inward protrusions, wherein, for each of the tapered inward protrusions, the flat region is contiguous with the inclined region and extends from the inclined region toward the stop surface;
  a gripping ring having an inner edge defining a series of teeth, the gripping ring being disposed within the circular recess of the first member;
  a support ring being disposed within the circular recess of the first member, the support ring having a proximal face that abuts the gripping ring and a distal face that encloses a portion of the annular recess; and
  an O-ring disposed within the annular recess.

10. The coupling of claim 9, wherein the gripping ring includes an outer body.

11. The coupling of claim 10, wherein the outer body of the gripping ring abuts the short face and the series of teeth of the gripping ring abut the first angled face when the coupling is in an unengaged position, the unengaged position comprising a position in which no conduit is engaged with the gripping ring of the coupling.

12. The coupling of claim 9, wherein the support ring includes an exterior surface, the exterior surface of the support ring abutting the long face of the generally J-shaped cross-sectional perimeter.

13. The coupling of claim 9, wherein the first passageway is in fluid communication with the second passageway to form a coupling passageway.

14. The coupling of claim 13, wherein the coupling passageway extends along a longitudinal axis of the coupling.

15. The coupling of claim 9, wherein the entry end of the first member includes an entry face defining an entry opening, the entry face comprising a recessed outer portion and a raised inner portion surrounding the entry opening.

16. The coupling of claim 9, wherein the interior surface of the first member further defines a mouth region, the first angled face being disposed at an acute angle relative to the mouth region, the first angled face and the mouth region defining an acute extension of the first member.

17. A method of manufacturing the coupling of claim 9, the method comprising:
  positioning the O-ring within the annular recess of the second member;
  positioning the gripping ring within the circular recess of the first member;
  positioning the support ring within the circular recess of the first member such that the proximal face of the support ring abuts the gripping ring; and placing the first member in snap fit engagement with the second member such that the distal face of the support ring encloses a portion of the annular recess.

18. The method of manufacturing the coupling of claim 17, wherein positioning the gripping ring within the circular recess of the first member comprises positioning an outer body of the gripping ring such that the outer body of the gripping ring abuts the short face and the series of teeth of the gripping ring abut the first angled face of the generally J-shaped cross-sectional perimeter.

19. The method of manufacturing the coupling of claim 18, wherein the support ring further comprises an exterior surface, and wherein positioning the support ring within the circular recess of the first member comprises positioning the support ring within the circular recess such that the proximal face of the support ring abuts the outer body of the gripping ring and the exterior surface of the support ring abuts the long face of the generally J-shaped cross-sectional perimeter.

* * * * *